US005783266A

United States Patent [19]
Gehrke

[11] Patent Number: 5,783,266
[45] Date of Patent: Jul. 21, 1998

[54] EASY-OPEN INDIVIDUAL SEALED SERVING PACKAGING

[76] Inventor: Russ Gehrke, 6721 Woodenshoe Rd., Neenah, Wis. 54956

[21] Appl. No.: 538,947

[22] Filed: Oct. 4, 1995

Related U.S. Application Data

[63] Continuation of Ser. No. 225,281, Mar. 11, 1994, abandoned.

[51] Int. Cl.⁶ .......................... B65D 33/28; B65D 65/02
[52] U.S. Cl. .................... 428/34.3; 428/35.3; 428/35.9; 428/43; 428/138; 428/192; 428/458; 428/461; 428/464; 428/475.8; 428/511; 428/516; 428/520; 206/484; 206/524.2; 206/800; 383/207
[58] Field of Search .......................... 206/800, 524.2, 206/484; 428/34.3, 34.2, 35.3, 35.9, 458, 461, 464, 475.8, 483, 516, 520, 138, 43, 511, 192; 383/207, 209

[56] References Cited

U.S. PATENT DOCUMENTS

| | | | |
|---|---|---|---|
| 3,201,258 | 8/1965 | Mastella | 206/800 |
| 4,022,373 | 5/1977 | Kohnlein et al. | 426/396 |
| 4,687,688 | 8/1987 | Curie et al. | 428/516 |
| 4,698,246 | 10/1987 | Gibbons et al. | 428/34.2 |
| 4,767,651 | 8/1988 | Starczewski et al. | 428/35.2 |
| 4,806,398 | 2/1989 | Martin, Jr. | 428/34.2 |
| 4,900,594 | 2/1990 | Quick et al. | 428/34.2 |
| 5,141,795 | 8/1992 | Kai et al. | 428/34.3 |
| 5,158,499 | 10/1992 | Guckenberger | 206/524.2 |
| 5,229,180 | 7/1993 | Littmann | 428/43 |
| 5,312,659 | 5/1994 | Otsuka et al. | 428/35.2 |

FOREIGN PATENT DOCUMENTS 0372886  6/1990  European Pat. Off. .

*Primary Examiner*—Rena Dye
*Attorney, Agent, or Firm*—McDermott, Will & Emery

[57] ABSTRACT

The present invention relates to easy-open hermetically sealed single serving packages. The present invention relates in particular to a multi-layer film that is particularly adapted for use in individually sealed packages where increased storage life of the packaged product is desired. The present invention is also useful in packaging multiple individual servings together in a single overall package, so that when the overall package is opened, the individual servings are protected from oxygen and moisture. More particularly, this invention is concerned with a novel film used for packaging individual sticks of chewing gum so that the freshness of each individual stick of chewing gum or the like is retained for extended periods of time after the overwrap packaging has been opened.

43 Claims, 3 Drawing Sheets

EASY-OPEN INDIVIDUAL SEALED SERVING PACKAGING

This is a continuation of application Ser. No. 08/225,281 filed Mar. 11, 1994 now abandoned.

The present invention relates to easy-open hermetically sealed single serving packages. The present invention relates in particular to a multi-layer film that is particularly adapted for use in individually sealed packages where increased storage life of the packaged product is desired. The present invention is also useful in packaging multiple individual servings together in a single overall package, so that when the overall package is opened, the individual servings are protected from oxygen and moisture. More particularly, this invention is concerned with a novel film used for packaging individual sticks of chewing gum so that the freshness of each individual stick of chewing gum or the like is retained for extended periods of time after the overwrap packaging has been opened.

BACKGROUND OF THE INVENTION

In the past, considerable difficulty has been encountered in providing a satisfactory single serving package that maintains the freshness and storage life of the packaged product while also providing an easy open feature. The present invention is to a novel individually sealed package used for retaining the freshness of the product after the user opens the outer overwrap. In particular, this invention has been adapted to retain the freshness of each individual chewing gum stick or other products that are contained in a multiple item packet.

Chewing gum is merchandised in various forms. One of the most common and popular forms is the "stick" gum. The present invention covers the unique packaging of stick gum and other individually packaged products. Today's sticks of chewing gum are usually "double" packaged by a two-fold process. First, the individual chewing gum stick is wrapped by a folded inner wrap and then an outer sleeve is placed over the inner wrap. In essence, each individual stick of chewing gum contains two wrappers. The inner wrap material widely used for chewing gum is an aluminum foil/wax/paper laminate or paper/wax laminate. As disclosed in U.S. Pat. No. 4,082,594 to Stonehouse, a problem that is encountered with this laminate is that curling may take place due to too little or too much moisture content in the paper layer. This is caused by the ambient moisturizing of the air during the high speed wrapping of the "sticks" of chewing gum. The individually wrapped sticks of chewing gum are then packaged in layers, one above the other, in a packet form and secured by an outer overwrap. This outer overwrap contains a polymeric or metal barrier to moisture and/or oxygen material, which protects the contents of the package from moisture loss and extends the shelf life of the package. Barrier layers have been used in the food packaging industry for the packaging of oxygen sensitive or moisture sensitive products. Products such as chewing gum sticks deteriorate particularly if subject to moisture loss once the outerwrap is opened, as the sticks of gum become stale and dried out. Other products, besides chewing gum sticks, deteriorate not only due to moisture loss, but also due to oxygen exposure once the outerwrap is opened.

One additional problem encountered with today's chewing gum packages is that it is very costly to wrap the chewing gum first with a folded inner wrap, then with an outer sleeve wrap, and package the entire packet of chewing gum sticks in a sealed overwrap. This packaging method also creates environmental concerns as it increases the amount of wrapper material used and then discarded. The user unwraps the individual sticks of chewing gum from the inner and outer sleeve wraps and disregards the individual wrappers and, after finishing the last stick, disregards the overall wrapping. The present invention permits the reduction of the amount of packaging required to a sealed individual package wrapped with an overall outerwrap as the outer sleeve wrap for each stick may, if desired, be eliminated.

An additional problem encountered by the user is that when the current package of gum sticks is opened, the outer barrier material is removed, exposing the individual gum sticks which are packaged by the folded innerwrap to possible moisture loss. This exposure to oxygen and moisture decreases the freshness of the product, which in turn decreases the storage life of the individual gum sticks. Most jumbo packages of chewing gum contain fifteen or more sticks, hence while the first few sticks are fresh when the pack is opened, the remaining sticks packaged by a folded inner sleeve, become stale and hard due to constant exposure to the atmosphere when left in the user's pockets or out on a table. This problem is particularly noticeable in sugarless gums, and particularly those gums that are stored in a dry atmosphere, i.e. an atmosphere having less than from 50 to 60% relative humidity. In a dry atmosphere with low relative humidity, moisture passes from the gum to the atmosphere thereby causing the gum to lose its freshness. Individual sticks of chewing gum prepared and stored, for extended periods of time, even at room temperature, tend to lose their moisture and elasticity with the result that they become brittle and initially crumble when they are placed in the user's mouth. This known arrangement makes it virtually impossible to offer the prospective user the fresh quality, texture, appearance and feel when an open package of gum is not immediately consumed. Once the outer barrier wrap of the overall package is removed and the remaining sticks are continuously exposed to the atmosphere for long periods of time, the freshness of the gum is diminished.

SUMMARY OF THE INVENTION

It has now been surprisingly discovered that superior easy-open hermetically sealed individual packages may be prepared according to the present invention. One of the advantages of the present invention is that an individual hermetically sealed package having good oxygen and moisture barrier properties is provided for individual products that are sold as part of a multiple product package. Each individual package is comprised of a multilayer sheet material which provides longer storage life by preventing moisture evacuation from the individually packaged products, i.e. sticks of chewing gum. The present invention provides an inexpensive easy open package for individually wrapping small products like chewing gum. Another advantage of the present invention is that each individually sealed package can if desired have the products' trademark and/or logo printed on the outside which eliminates the need for "double" wrapping the package with a separate printed outer sleeve of paper. The present invention provides a single package which can be provided with a printable outer surface and barrier properties to retain the fresh quality of each individual product. The package of the present invention improves the packaging of similar products known in the prior art, by requiring fewer steps, thereby saving time and production costs. The packaging of the present invention does not require "double" wrapping, i.e. an inner foil/paper wrap and then applying an outer paper sleeve to individual products, such as sticks of chewing gum.

In the present invention, a multilayer film having first and second layers, and preferably a core layer there between, is used to form a package. The package preferably has at least one layer which is relatively impervious to the transmission of oxygen and/or moisture, at least one layer which is sealable preferably by heat, and an easy-open feature formed by scoring or roughening the outer surface. The preferred method of forming the easy open feature is laser scoring.

The present invention comprises an outer layer of either polyester, paper, oriented polypropylene or other suitable material that can be scored. The outer layer of the laminate is preferably polyethylene terepthalate (PET). The inner layer of the multilayer sheet material, i.e. the layer in contact with the product, is preferably a sealable layer comprised of a polyolefin selected from a group consisting of copolymers of ethylene such as ethylene methacrylate (EMA), low density polyethylene (LDPE), ethylene vinyl acetate (EVA), blends of linear low density polyethylene (LLDPE) and EVA, blends of LDPE and LLDPE, and an ionomer such as that sold commercially under the trademark "Surlyn". The blends in the inner layer may be from 25% to less than 100% of low density polyethylene and greater than 0% up to 75% linear low density polyethylene. Alternatively, the inner layer may be comprised of a blend of 25% to less than 100% of EVA and greater than 0% up to 75% linear low density polyethylene. The core layer of the multilayer film is a barrier layer. The barrier can be either a metal foil, a thin layer of metal formed by vapor deposition, a vinylidene chloride copolymer, MXD6, a xylene group-containing polyamide resin known as nylon MXD6, (available from Toyobo or Mitsubishi Gas Chemicals Company,) nylon or ethylene vinyl alcohol (EVOH). The preferred barrier material is a metal layer formed by vapor deposition which is an inexpensive means for providing an oxygen and moisture barrier in a multi-layer laminate. Individually wrapping each product or stick of gum in this multi-layer laminate eliminates the need of having an oxygen and moisture barrier overwrap. It is significantly less costly to wrap the individual products in this laminate than it is to use a foil layer in the outer wrapper of a jumbo chewing gum package.

In summary, it is an object of the present invention to improve the packaging of individual gum sticks or the like so that they do not absorb significant quantities of moisture from the atmosphere or lose significant quantities of moisture to the atmosphere. This extends the storage life of the product after the user opens the package of chewing gum.

It is a further object of the present invention to decrease the amount of time and packaging used to wrap individual chewing gum sticks and to reduce packaging costs by providing a single sealed primary package for each stick of chewing gum.

It is still another object of the present invention to provide the user with an easy-open feature by laser scoring the multilayer sheet material used to form the package for individually wrapping the chewing gum stick or the like.

The invention, accordingly, comprises an article possessing the construction, combination of elements, and arrangements of parts which are exemplified in the following detailed disclosure. For a fuller understanding of the nature and objects of the invention, reference should be made to the following description taken in connection with the accompanying drawings.

DETAILED DESCRIPTION

Figure 1:
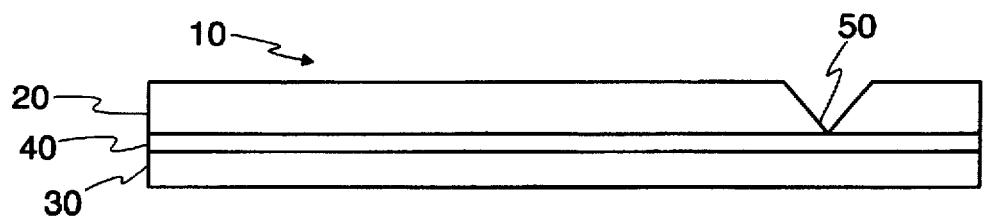
FIG. 1 is a sectional view of the multilayer sheet material of the present invention.

The multilayer sheet material structure (10) used to fabricate the packages of the present invention is shown in FIG. 1. The multilayer sheet material is comprised of an outer layer (20), an inner layer (30), and a core layer (40). The outer layer of the sheet material (10) is comprised of a suitable polymeric material preferably one that has a certain stiffness, such as a polyester, an oriented polypropylene or paper. The core layer is a barrier layer comprised of materials suitable for preventing the transmission of oxygen and/or moisture. The sheet material of the present invention is scored or roughened, preferably with a laser which cuts thorough the outer surface but not the core layer to provide an easy open feature. When a metal foil or a layer of metal formed by vapor deposition is used in the barrier layer, the laser reflects off the core layer (40) providing for a clean cut (50) of the appropriate depth. Although only three layers are depicted in FIG. 1, additional layers may be included, i.e., an adhesive or tie layer, or a primer layer. Additional layers may also include a layer to provide a suitable printing surface and one or more layers on the printed layer to protect the print.

The inner layer (30) of the sheet material (10) contacts the product contained in the package and also serves as the seal layer. The layer is preferably comprised of polyethylene, or copolymers of ethylene, for example, low density polyethylene (LDPE), blends of linear low density polyethylene (LLDPE) and LDPE, ethylene vinyl acetate (EVA), blends of LLDPE and EVA, and ionomers such as that sold commercially under the trademark "Surlyn". The inner or sealable layer is selected preferably because it forms a good heat seal. The heat seal allows the product, i.e. a chewing gum stick, to retain its freshness during the shelf life and after the product's outer package has been opened by the user.

The outer layer (20) of the sheet material structure (10) of the present invention may be comprised of a polyester, oriented polypropylene, paper or other material which may be readily scored or roughened by mechanical means or by a laser. The outer layer (20) is preferably comprised of a polyester such as polyethylene terepthalate (PET). The outer layer (20) material may also be suitable for coating with a thin layer of metal by means of vapor deposition.

In another embodiment, a core layer (40) comprised of a barrier material is between the outer and inner layers (20, 30). The core layer (40) is an oxygen and/or moisture barrier comprised of a metal foil such as aluminum foil, polyvinylidene chloride copolymer (PVDC) or ethylene vinyl alcohol (EVOH). The polyvinylidene chloride copolymer may be a copolymer with vinyl chloride or an alkyl acrylate such as methyl acrylate. The preferred barrier material (40) is comprised of a thin layer of metal formed by vapor deposition, on the inner surface of the outer layer.

There are numerous embodiments of the present invention comprising different combinations of the various materials for each of the multiple film or sheet material layers. A preferred embodiment of the present invention is a sheet material comprised of an outer layer of polyethylene terepthalate (PET), oriented polypropylene nylon or paper, an inner layer of low density polyethylene, wherein a thin layer of metal is formed by vapor deposition on the surface of the outer layer that contacts the inner layer of LDPE. When the outer layer of the film is laser scored, the laser cuts through the PET. When it reaches the metal surface formed by vapor deposition, the laser reflects off the metal to provide a good clean cut for easy opening of the package by the user. Another embodiment of the present invention is a multi-layer laminate comprised of an outer layer of oriented polypropylene (OPP), an inner heat sealant layer of ethylene vinyl acetate (EVA), and a core of a metal. In this embodiment, the laser cuts through the oriented polypropylene layer to the core of metal.

Another embodiment of the present invention is a package having a multilayer laminate comprising only two layers: an outer layer of polyester, oriented polypropylene, nylon or paper, and an inner layer of a polyethylene or polyethylene copolymer. The outer layer maybe metallized if desired. If metallized it is often desirous to coat the metallized surface with a primer of urethane or an imine such as polyethylene imine. The outer layer of paper is suitable for laser scoring and the paper also exhibits excellent deadfold properties, while the inner layer of polyethylene remains relatively unaffected by the laser and facilitates the formation of the package.

In addition to the three layer structures detailed above, the multilayer laminate used in the package of the present invention may have additional layers. In some embodiments, a tie or an adhesive layer may be disposed on either side of the core layer. Suitable materials for such layers are known to the ordinary skilled artisan and may include, by way of example, anhydride modified polyolefins (e.g., graft copolymer of maleic anhydride and propylene wherein maleic anhydride moieties are grafted onto polypropylene chains), ethylene acrylic acid copolymers, ethylene methyl acrylate copolymers, blends or copolymers of polypropylene and EVA, or other synthetic resinous materials. The selected adhesive should be stable for the conditions under which the packages of the invention are fabricated and used. For additional information on adhesives, reference is made to U.S. patent application Ser. No. 07/458,489, filed Dec. 28, 1989 incorporated herein by reference.

The hermetically sealed package of the present invention is formed by fabricating a multiple layer film or sheet material as disclosed above, scoring the outer layer of the film or sheet material, (preferably with a laser) equidistant from and along two opposing edges. C-folding the film or sheet material so that the fold is parallel to the laser scored lines and heat sealing the three open sides after inserting the product so that the laser scored lines are between the seal and the product. The sheet material of the present invention can also be formed into a hermetically sealed package by forming two films or sheets of material of the same size, laser scoring the surface of the outer layer of one or both of the sheets, positioning the two films or sheet materials so that the inner surfaces are in face to face contact, the perimeters are aligned and the product is disposed between them, and heat sealing the perimeter of the two films or sheet material so that the laser score lines are between the seal and the product. The laser scoring can be a single line or more preferably, it can be a double scored line wherein two parallel laser scored lines in close proximity are used. The advantage of a double score line on the package is that when folding the single sheet or aligning the two sheets of material the score lines are less likely to be misaligned. In addition, the double score line makes it easier for the user to open the package with the easy open tear feature. When a single film or sheet material is used to make the package, a single laser score line can be used along the axis of the fold to facilitate making the C-fold. Additionally, other easy-open features known in the art, such as a tear strip or tab features can also be used.

Figure 2:
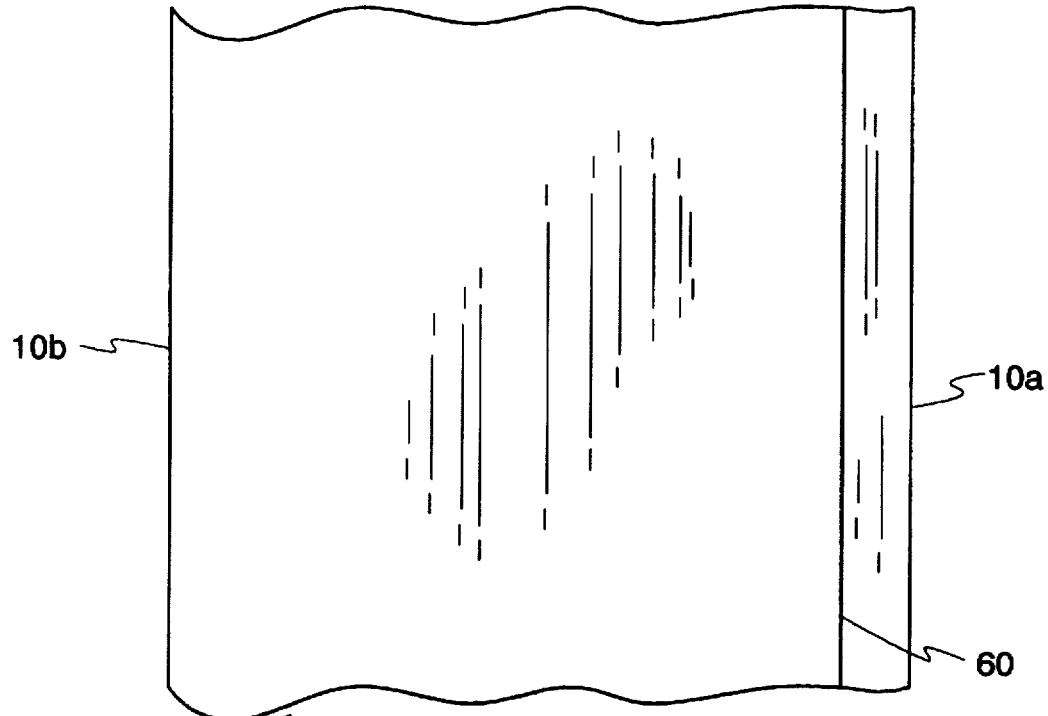
FIG. 2 is a top view of the sheet material with a single laser scored line on one side.

FIG. 2 shows a top view of the sheet material (10) of FIG. 1 which has a continuous laser score line (60) along the entire length of one edge (10a) of the sheet material, preferably disposed adjacent to the seal area between the seal and the contents of the package. The laser scores the outer layer (20) of the film or sheet material as shown in FIG. 1. The laser scores the outer layer from the surface to the barrier, but does not cut through the barrier. In a preferred embodiment, the barrier is comprised of metal, and the metal reflects the laser to provide a clean cut in the outer layer without affecting other layers of the structure. The laser scoring is performed preferably prior to folding the film structure.

Figure 3:
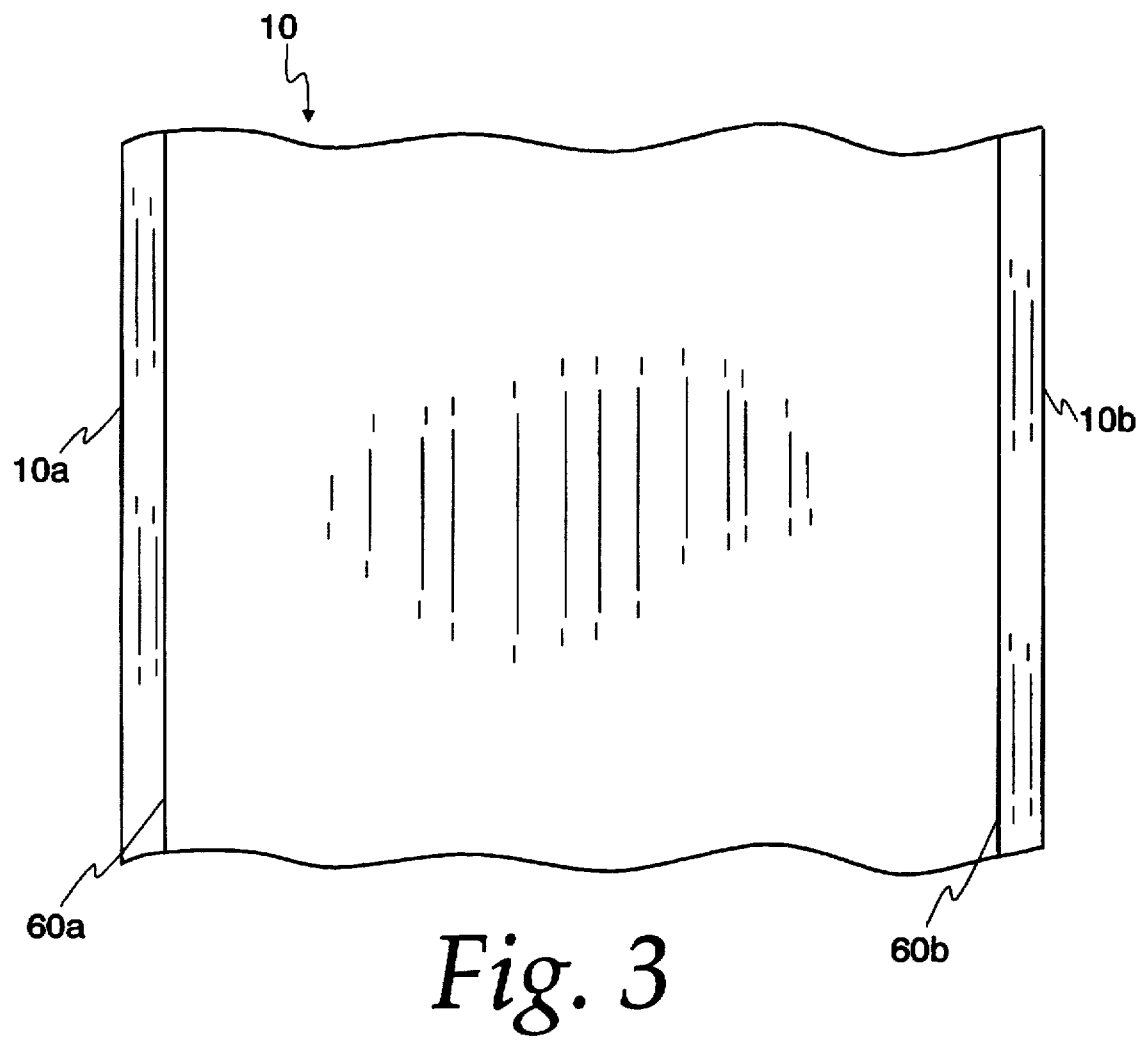
FIG. 3 is a top view of the sheet material with two laser score lines one on each side.

FIG. 3 shows a top view of the sheet material (10) with two parallel laser scored lines (60a, 60b) in the outer layer along opposing edges (10a, 10b) of the sheet material (10). When the sheet is folded along a central axis parallel to the laser scored lines (60a, 60b) so that the inner layer contacts itself, the laser scored lines should be substantially aligned. The depth of the laser scoring will vary according to the sheet material structure, including the materials used and the thickness of each layer. In all of the embodiments of the present invention, the laser scoring should not score the barrier layer.

Figure 4:
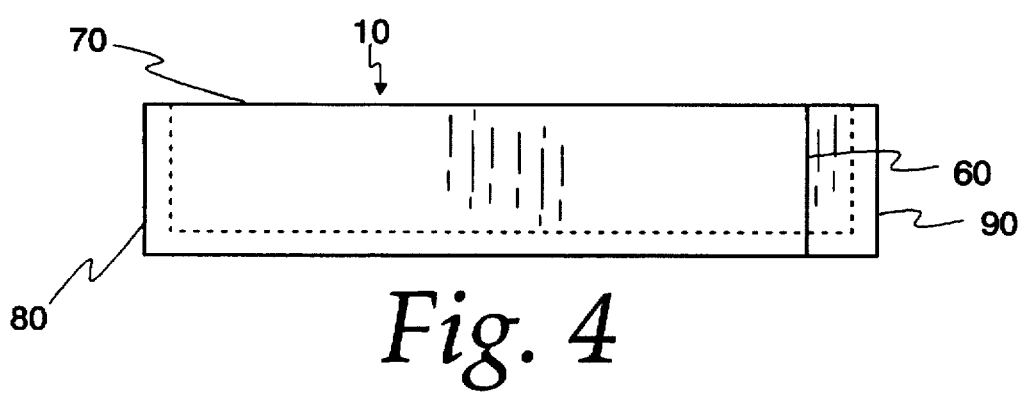
FIG. 4 is a top view of the sheet material formed into a sealed package showing a vertical C-fold with a single score line.

FIG. 4 shows a top view of the sheet material as shown in FIG. 2 that has been hermetically sealed along three edges to form a package (80). The package (80) has a single score line (60) in the outer layer of one of the package walls, which is preferably adjacent to the seal (90) and between the seal and the product. The package (80) has two opposing walls formed by folding the sheet material (10) along a fold line (70) that is perpendicular to the laser score line (60). The fold line (70) is known as a C-fold and it forms one edge of the package after the product is inserted and the three remaining edges are sealed. The package hermetically seals the product within and maintains the freshness of the stick of chewing gum. The laser score line (60) is located between the seal (90) and the contents of the package to provide easy opening thereof.

Figure 5:
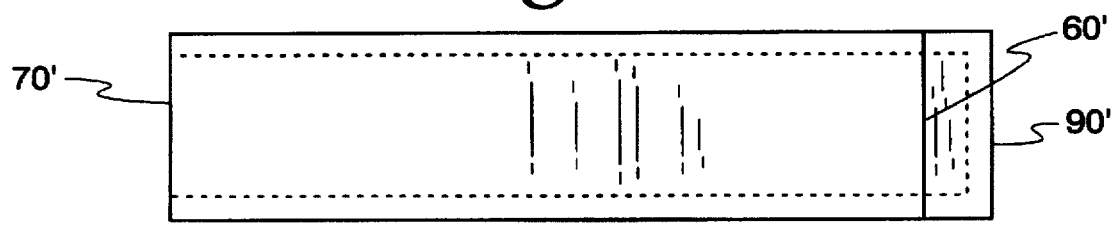
FIG. 5 is a top view of the sheet material formed into a sealed package showing a vertical C-fold with a double score line.

FIG. 5 shows a top view of another embodiment of the package made from the sheet material in either FIGS. 2 or 3. The outer layer of sheet material (10) in FIG. 2 has a laser scored along one edge (10a) and the outer layer of the sheet material (10) in FIG. 3 is scored along two opposing edges (10a, 10b). The package in FIG. 5 is formed by folding the sheet material (10) along a central axis parallel to the laser score line(s) so that the inner layer contacts itself and the opposing edges (70', 90') are aligned. When the sheet material (10) of FIG. 3 is used, the laser score lines (60a, 60b) are substantially aligned. After a product is disposed between the two package walls formed by folding the sheet material (10), the three open edges are heat sealed to form a hermetically sealed package with the laser score line(s) (60') between the heat seal and the product. The score line (60') can be a single laser score line or a double laser score (60') line and it provides an easy open tear strip.

Although FIGS. 4 and 5 disclose a package formed by folding a single film or sheet material, another embodiment has two sheets of films or material with one or two score lines positioned with the inner layers face-to-face. After a product is disposed between the two sheets, the four open edges are hermetically heat sealed to form the package.

Figure 6:
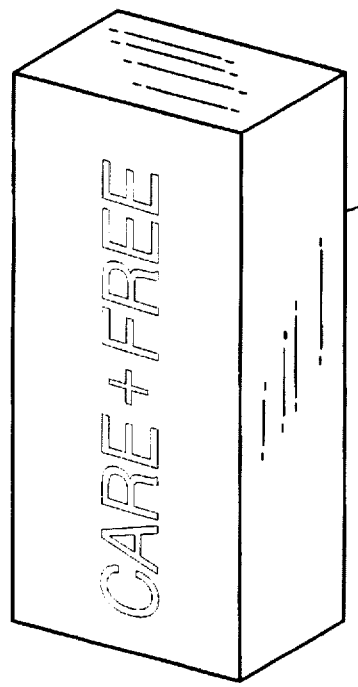
FIG. 6 is a side view of an fifteen stick chewing gum package.
Figure 7:
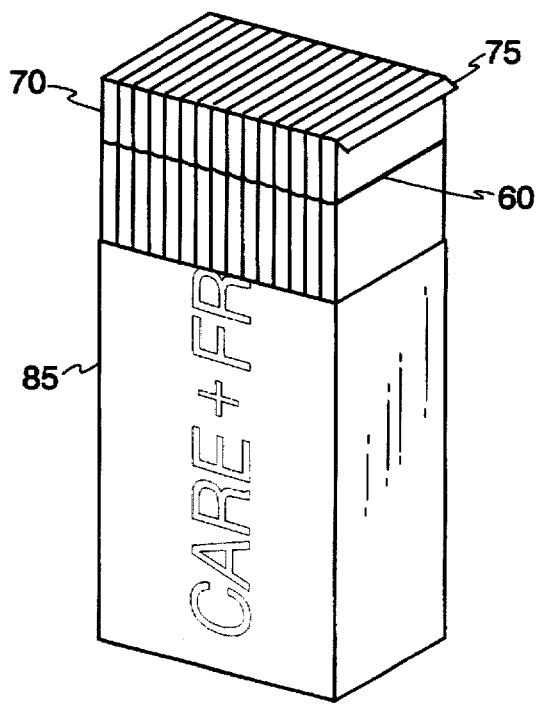
FIG. 7 is a side view of an opened fifteen stick package of chewing gum depicting the laser score line on the outer surface of the sealed inner package.
Figure 8:
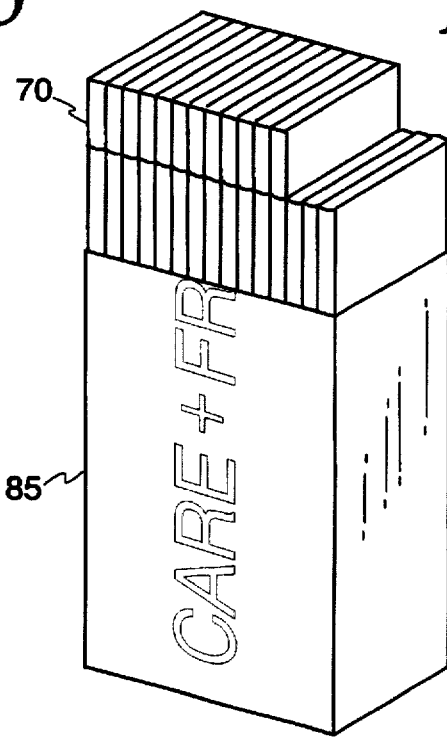
FIG. 8 is a side view of an open fifteen stick package with three chewing gum sticks removed.

FIGS. 6, 7 and 8 show the package of the present invention with an overwrap that forms a 15-piece chewing gum package. FIG. 6 shows an unopened fifteen stick chewing gum pack with a known outer foil wrapper (85). This wrapper may now be comprised of a less expensive material even without a barrier because the present invention provides a barrier for each individually sealed stick of chewing gum (70). FIG. 7 shows that after the outer wrapper (85) is opened, the individual sticks of chewing gum are exposed to oxygen and moisture in the atmosphere. As shown in FIG. 7, the laser score lines (60) are at the open end of the outer package (70) and the end seal (75) is folded. The upper portion of the outer wrapper (85) in FIG. 7 is removed by a known tear strip. By applying a slight pressure the user can break the seal on an individual package at or about the score line to open the individual chewing gum package and remove the stick of gum. The score line (60) provides the easy open feature of the present invention. FIG. 8 shows three of the individual sticks of chewing gum removed with the remaining twelve sticks protected from moisture loss by the individual packages. This allows unused sticks of gum to remain fresh after the package has been opened for a long period of time.

As discussed above, a preferred embodiment of the present invention uses a three layer sheet material with an outer protective layer and an inner heat sealant layer and a barrier core layer. However, the sheet material may have additional layers such as a tie layer or on adhesion layer.

The oriented polypropylene used in this invention, may be oriented, by conventional processes, such as blown tubular orientation, stretch orientation, or molecular orientation.

In addition to using ink or an ink layer for printing on the individual chewing gum wrappers of this invention, other appropriate printing processes can be used, e.g., a rewinder which imprints appropriate characters into the film comprising polymeric and/or thermoplastic material. The packages of this invention can be heat or adhesive sealed to provide a hermetic seal. It has been found that laser scoring the entire width of the package material, including across the area that is sealed, does not weaken or reduce the air-tightness of the package.

Throughout this specification, reference is made to multilayer structures, inner wrappers, film structures and sheet materials. These structures are the same thickness as conventional structures used for similar packaging applications. Typical thicknesses of films and film structures can range from about 0.25 mils to 2.0 mils preferably about 0.75 to about 1.5 mils. Films thinner than about 0.25 mils may not have the strength necessary to perform the required function.

As to extrusion or coextrusion methods and apparatus for making multiple layer sheet materials, reference is made to commonly owned U.S. patent application Ser. Nos. 07/458,486, 07/458,487, and 7/458,488, all filed on Dec. 28, 1989, and each incorporated herein by reference. For further background on films and apparatus for producing them, reference is made to U.S. Pat. Nos. 3,477,099, 4,755,402, 3,558,330, 4,714,638, 4,842,791, 4,379,117, and 4,804,510 each of which is incorporated herein by reference. For background on barrier compositions and articles made therefrom reference is made to U.S. Pat. No. 5,281,360 which is incorporated herein by reference. As to easy-open packages and closure, reference is made to commonly owned U.S. patent application Ser. Nos. 07/534,200 filed on Jun. 6, 1900, 07/771,643 filed on Oct. 4, 1991, and 07/838,244 filed on Feb. 12, 1992 and each incorporated herein by reference.

With respect to means for opening packages, or to laser scoring, or to sheet material structures, reference is made to the following:

U.S. Pat. Nos. 3,313,642, 3,404,988, 3,608,815, 3,626,143, 3,693,785, 3,790,744, 3,909,582, 3,925,591, 3,986,640, 4,172,915, 4,217,327, 4,236,652, 4,356,375, 4,407,873, 4,543,279, 4,549,063, 4,557,377, 4,571,340, 4,656,094, 4,698,246, 4,762,514, 4,765,999, 4,778,058, 4,784,885, 4,785,937, 4,788,105, 4,808,421, 4,834,245, 4,880,701, 4,894,115, 4,934,245; and Japanese Utility Model Publications Nos. 54-22484 and 51-48775. Reference is also made to U.S. Pat. No. 4,681,781, German Patent Document 2803074, UL 973,109 and EPA 0357841.

Bowen, U.S. Pat. Nos. 3,909,502 and 3,709,444 Fry, U.S. Pat. No. 3,626,143, Ang, U.S. Pat. No. 4,549,063, Josephy, U.S. Pat. No. 4,356,375 and Yoshida, U.S. Pat. No. 4,762,514 all relate to laser scoring and each of these U.S. Patents is hereby incorporated herein by reference.

Bowen, U.S. Pat. No. 3,790,744 relates to forming one line of weakness in at least one but not all layers of a multilayer structure by preferentially vaporizing with a beam of radiant energy a line in at least one layer which is not the most proximate layer in relation to the source of radiant energy. Bowen, U.S. Pat. No. 3,909,582, deals with forming a line of weakness defining a tear path in a multilayer sheet material by scoring with a beam of radian energy the most proximate layer in relation to the source of radiant energy.

Fry, U.S. Pat. No. 3,626,143, similarly relates to focusing a single beam of laser light upon a thermoplastic substrate so as to form a single score.

The score line may be either a single line or a pair of parallel lines as disclosed in commonly owned U.S. application Ser. Nos. 07/720,121 filed on Jul. 1, 1991 and 08/048,754 filed on Apr. 16, 1993, the disclosures of which are incorporated herein by reference. The score line may extend across the entire surface of the packages including the area of the end seals.

Where the score is caused by a laser it is important not to score too deeply in order to prevent premature rupturing of the package. In multi-layer sheet materials, the laser score extends through the first layer and into the second layer for a two layered film.

As stated above there can be a plurality of score lines to render the package more easily opened. The score lines can be approximately 1/16", 1/8" or 3/16" apart and naturally, the distance may be varied to suit the sheet material and the purposes of the individual package. The scores are preferably continuous but need not be. For example, the scores can be two cuts or a series of cuts.

Having thus described in detail preferred embodiments of the present invention, it is to be understood that the inven- tion defined by the appended claims is not to be limited by particular details set forth in the above description as many apparent variations thereof are possible without departing from the spirit or scope of the present invention.

I claim:

1. A packaging system adapted for packaging a product comprising a first packaging substrate said first packaging substrate being adapted when sealed to form an air tight package and a second separate packaging substrate completely enclosed within said first packaging substrate, wherein said first and second packaging substrates are not fixedly joined together and wherein said second packaging substrate forms a separate individually sealed package within said first packaging substrate, said second packaging substrate in contact with the product to be packaged comprising a sheet having a first layer, a second layer, and a barrier layer disposed between said first layer and said second layer, said second layer material selected from the group consisting essentially of polyester, oriented polypropylene, nylon and paper and said first layer of a polyolefin selected from the group consisting essentially of ethylene methacrylate, ethylene vinyl acetate, blends of low density polyethylene and linear low density polyethylene and blends of ethylene vinyl acetate and linear low density polyethylene, and ionomers, said sheet of said second packaging substrate having an easy-open feature and said sheet of said second packaging substrate having a thickness from about 0.25 mils to 2.0 mils.

2. A packaging system according to claim 1 wherein the barrier layer is a metal.

3. A packaging system according to claim 2 wherein the barrier layer is a metal formed by vapor deposition.

4. A packaging system according to claim 1 wherein the easy-open feature comprises at least one score line on the second layer.

5. A packaging system according to claim 4 wherein the score line is formed by a laser.

6. A packaging system according to claim 1 wherein the polyester is polyethylene terephthalate.

7. A packaging system according to claim 1 wherein the first packaging substrate has a tear strip to provide easy-opening of the first packaging substrate.

8. A packaging system according to claim 1 wherein the sealable layer is a blend from 70% to less than 100% of low density polyethylene and greater than 0% up to 30% linear low density polyethylene.

9. A packaging system according to claim 1 wherein the sealable layer is a blend from 50% to less than 100% of low density polyethylene and greater than 0% up to 50% linear low density polyethylene.

10. Packaging system according to claim 1 wherein the sealable layer is a blend from 25% to less than 100% of low density polyethylene and greater than 0% up to 75% linear low density polyethylene.

11. A packaging system according to claim 1 wherein the sealable layer is a blend from 70% up to 100% ethylene vinyl acetate and up to 30% linear low density polyethylene.

12. A packaging system according to claim 1 wherein the sealable layer is a blend from 50% up to 100% ethylene vinyl acetate and up to 50% linear low density polyethylene.

13. A packaging system according to claim 1 wherein the sealable layer is a blend from 25% up to 100% ethylene vinyl acetate and up to 75% linear low density polyethylene.

14. A film according to claim 1 wherein said second or sealable layer comprises low density polyethylene.

15. A packaging system adapted for packaging a product comprising a first packaging substrate said first packaging substrate being adapted when sealed to form an air tight package and a second separate packaging substrate completely enclosed within said first packaging substrate, wherein said first and second packaging substrates are not fixedly joined together and wherein said second packaging substrate forms a separate individually sealed package within said first packaging substrate said second packaging substrate in contact with the product to be packaged comprising a sheet having an outer layer of a material selected from the group consisting essentially of polyester, oriented polypropylene, nylon; an inner layer of a polyolefin selected from the group consisting essentially of ethylene methacrylate, blends of low density polyethylene and linear low density polyethylene and blends of ethylene vinyl acetate and linear low density polyethylene, and ionomers; and a barrier layer disposed between said outer layer and said inner layer; and said sheet of said second packaging substrate having an easy-open feature and said sheet of said second packaging substrate having a thickness from about 0.25 mils to 2.0 mils.

16. A packaging system according to claim 15 wherein the barrier layer is a metal.

17. A packaging system according to claim 16 wherein the barrier layer is a metal formed by vapor deposition.

18. A packaging system according to claim 15 wherein the easy-open feature comprises at least one score line on the second layer.

19. A packaging system according to claim 18 wherein the score line is formed by a laser.

20. A packaging system according to claim 15 wherein the polyester is polyethylene terephthalate.

21. A packaging system according to claim 15 wherein the first packaging substrate has a tear strip to provide easy-opening of the first packaging substrate.

22. A packaging system according to claim 15 wherein the sealable layer is a blend from 70% to less than 100% of low density polyethylene and greater than 0% up to 30% of linear low density polyethylene.

23. A packaging system according to claim 15 wherein the sealable layer is a blend from 50% to less than 100% of low density polyethylene and greater than 0% up to 50% of linear low density polyethylene.

24. A packaging system according to claim 15 wherein the sealable layer is a blend of from 25% to less than 100% of low density polyethylene and greater than 0% up to 75% of linear low density polyethylene.

25. A packaging system according to claim 15 wherein the sealable layer is a blend from of 70% to less than 100% of ethylene vinyl acetate and up to 30% of linear low density polyethylene.

26. A packaging system according to claim 15 wherein the sealable layer is a blend from 50% to less than 100% ethylene vinyl acetate and up to 50% linear low density polyethylene.

27. A packaging system according to claim 15 wherein the sealable layer is a blend from 25% to less than 100% ethylene vinyl acetate and up to 75% linear low density polyethylene.

28. A packaging system according to claim 15 wherein the first packaging substrate contains a barrier.

29. A packaging system according to claim 28 wherein the barrier is a metal between the outer layer and the inner layer of the second substrate.

30. A multiple product packaging unit comprising a first packaging substrate and a second packaging substrate, said first packaging substrate forming an outer wrapping around said second packaging substrate and said first packaging substrate having a tear strip to provide easy-opening of said first packaging substrate, said second packaging substrate comprising individually sealed packages, wherein each individually sealed package comprises an outer layer of a material selected from the group consisting of polyesters, oriented polypropylene, nylon and paper; a sealable layer selected form the group consisting of ethylene methacrylate, ethylene vinyl acetate, blends of low density polyethylene and linear low density polyethylene and blends of ethylene vinyl acetate and linear low density polyethylene, and ionomers; and a barrier layer disposed between said outer layer and said sealable layer; and wherein each of said individually sealed packages has an easy-open feature.

31. A multiple product packaging unit according to claim 30 wherein the barrier layer is comprised of metal.

32. A multiple product packaging unit according to claim 31 wherein the barrier layer is comprised of metal formed by vapor deposition.

33. A multiple product packaging unit according to claim 30 wherein the easy-open feature of each of said individually sealed packages comprises a score line in said outer layer.

34. A multiple product packaging unit according to claim 33 wherein the score line has been formed by a laser.

35. A multiple product packaging unit according to claim 30 wherein the polyester is polyethylene terephthalate.

36. A multiple product packaging unit according to claim 30 wherein the sealable layer is a blend from 70% to less than 100% of low density polyethylene and greater than 0% up to 30% linear low density polyethylene.

37. A multiple product packaging unit according to claim 36 wherein the sealable layer is a blend from 50% to less than 100% of low density polyethylene and greater than 0% up to 50% linear low density polyethylene.

38. A multiple product packaging unit according to claim 30 wherein the sealable layer is a blend from 25% to less than 100% of low density polyethylene and greater than 0% up to 75% linear low density polyethylene.

39. A multiple product packaging unit according to claim 30 wherein the sealable layer is a blend from 70% to less than 100% ethylene vinyl acetate and up to 30% linear low density polyethylene.

40. A multiple product packaging unit according to claim 30 wherein the sealable layer is a blend from 50% to less than 100% ethylene vinyl acetate and up to 50% linear low density polyethylene.

41. A multiple product packaging unit according to claim 30 wherein the sealable layer is a blend from 25% to less than 100% ethylene vinyl acetate and up to 75% linear low density polyethylene.

42. A multiple product packaging unit according to claim 30 wherein the second packaging substrate has a thickness from about 0.25 mils to 2.0 mils.

43. A multiple product packaging unit according to claim 30 wherein the sealable layer comprises low density polyethylene.

* * * * *